Figure 1:
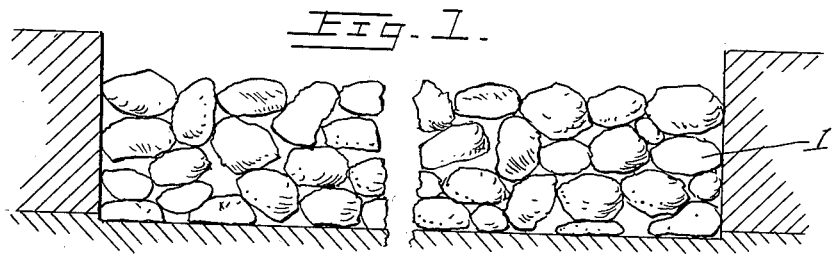

June 29, 1937.    W. P. DAY    2,085,420
METHOD OF MAKING OR REPAIRING ROADS
Filed Oct. 29, 1935

SECTION OF ROAD

Patented June 29, 1937

2,085,420

UNITED STATES PATENT OFFICE 2,085,420

METHOD OF MAKING OR REPAIRING ROADS

William P. Day, Cleveland Heights, Ohio, assignor to The International Vibration Company, Cleveland, Ohio, a corporation of Ohio Application October 29, 1935, Serial No. 47,297

4 Claims. (Cl. 94—23)

This invention relates to a method of repairing and rebuilding roads or roadbeds and is applicable to a highway, street or railway roadbed.

Heretofore, in repairing or rebuilding roads, it was thought necessary to remove the old roadbed and replace it with new road-forming material which necessitated considerable labor and expense which in many cases is not necessary.

I have devised a method of repairing or rebuilding roads in which the materials which formed the old roadbed are used, in most cases without the addition of any new road-forming material, with the exception of a small amount of grout, thus avoiding the necessity of removing and disposing of the old road material, as well as the expense of new road-forming material.

The main object of my invention is to provide a method of repairing or rebuilding roads which has the advantages herein described and which can be used to effectively repair or rebuild roads with only a fraction of the expense required to build new roads.

Another object of the invention is to provide a method of repairing or rebuilding roads which will permit the road to be opened for traffic within a minimum time.

Further and more limited objects of this invention will appear as the description proceeds and in which I will describe at least three forms or modifications of my method.

Broadly speaking, my method consists in breaking up the old roadbed into large or small pieces or particles and then bonding such pieces or particles together with grout by causing the grout to permeate the mass by applying rapid and violent vibrations to the mass.

The cause of failure of roads in most cases is due to the breaking up or the wearing out of the old roadbed and caused by a failure of the bond between the particles of the road forming materials. When this bond fails, the road breaks up or ruts or holes are formed therein which make it unsatisfactory and unsafe. Such a condition is generally due to the fact that water and other foreign materials enter cracks and crevices in the road. Freezing and thawing action results in a breaking down of the old roadbed. I propose to make use of practically all, if not all, of the old roadbed and to impregnate it with sufficient grout, concrete, cement or other suitable bonding material to form a bond between the particles thereof and which will render the road serviceable for many years.

Heretofore, it has been the practice to lay concrete without any special attention to the pattern of the aggregate in the same. According to my method, I seat and wedge the aggregate so that every adjacent piece will find its gravitated angle of repose that is conducive to filling the maximum amount of voids with graded sizes and so as to form a load bearing structure having the maximum strength. It has also been the practice to roll aggregate with a heavy roller to obtain a high aggregate concrete. My method differs from such practice in that when a roller is used, instead of finding a natural angle of repose, the particles are crushed or crumbled, destroying any predetermined pattern and creating undesirable dust. Rolling the surface also tends to close the apertures on top of the concrete thus retarding the entry of the grout. My method permits the entry of grout more easily and the use of a grout of dryer consistency due to the fact that the aggregate is in a state of agitation and there are no crumbled particles or dust to hamper it further because the agitation changes the relationship and pattern of the aggregate simultaneously with the entry of the grout. With my method I am also able to eliminate the use of heavy, cumbersome and expensive equipment.

In practicing my method, according to the preferred embodiment, I first scarify and clean the old roadbed with a suitable tool. I then break up the old roadbed with a suitable tool, such as a pneumatic chisel or other machine which is available for that purpose. I then preferably remove all of the old road forming material and separate the large and small pieces or particles. The larger pieces usually vary in size from 3″ to 6″ in diameter and frequently are of irregular shape. The smaller particles will vary in size from 3″ down to particles having the size of coarse sand or gravel. I then replace on the old roadbed the larger particles which make up about 75% of the old material. The depth of this layer of large particles varies according to the depth and character of the road, but with a road of say 9″ depth, this first layer is preferably about 5″. I then spread the smaller particles over the road by any suitable means. The depth of this layer of smaller particles will vary from 1″ to 3″ depending upon the depth and character of the original roadbed. I then apply rapid and violent vibrations over the entire surface of the road so formed to cause these smaller particles to permeate the mass and to fill the voids between the large and small particles.

The vibrating tool or machine forms no part of this invention, but I preferably make use of a machine having a considerable area and which rests upon plates of considerable width or depth and which rest upon the large particles. The vibrations are preferably obtained by means of a machine having an off center weight or fly wheel and which is operated at a high speed and so constructed as to impart a blow of about 1600 lbs. to 2000 lbs. The machine is operated at a speed of between 2000 and 4000 revolutions per minute. This compacts the subgrade and tightens the aggregate on to the base and causes the small particles to wedge between the larger particles. The amount of vibration may vary but is usually from 30 to 60 seconds per square foot of area, depending upon the depth of the road and the particular character of the road forming material.

I then cover the road so formed with a layer of concrete of about two to three inches in depth. I then spread over the road a layer of granite screenings which vary in size from about 1/8" to 1/2". I then again apply rapid and violent vibrations to the road to cause the grout to penetrate the lower mass and to be effectively mixed with the granite screenings. It is to be understood that sufficient grout is used to thoroughly penetrate the mass and that sufficient granite screenings are used to provide a road of the desired depth. The grout is preferably a mixture of sand, cement and water which will not readily flow without vibration. The vibrations cause the grout to permeate the mass and to form a bond between the large and small particles. I reduce the shrinkage to a minimum by controlling the water ratio and the character of the mix. The vibrations wedge the aggregates close together and mechanically retard shrinkage from the sides. It has long been known that these factors effect shrinkage but with my method I am able to practically eliminate shrinkage. A small amount of aggregate in the grout will not adversely affect this process and may be used with beneficial results.

Figure 2:
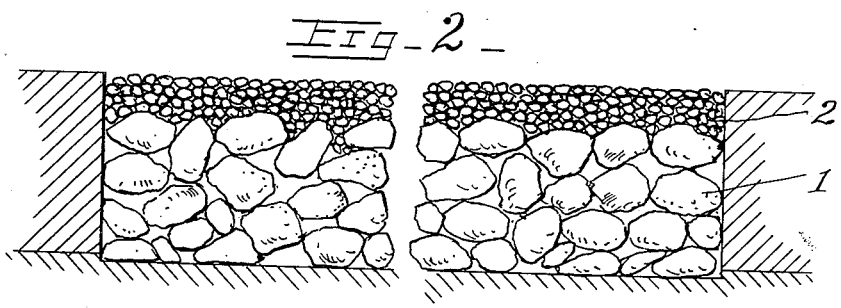
Figure 3:
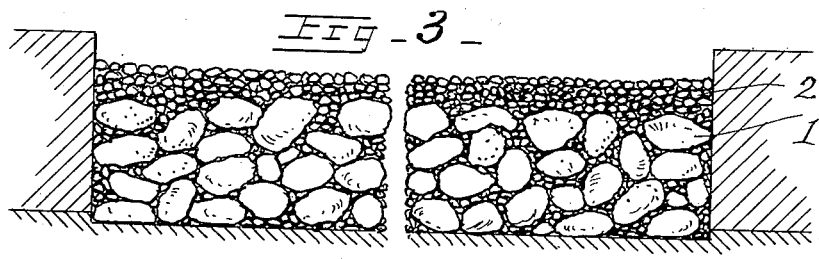
Figure 4:
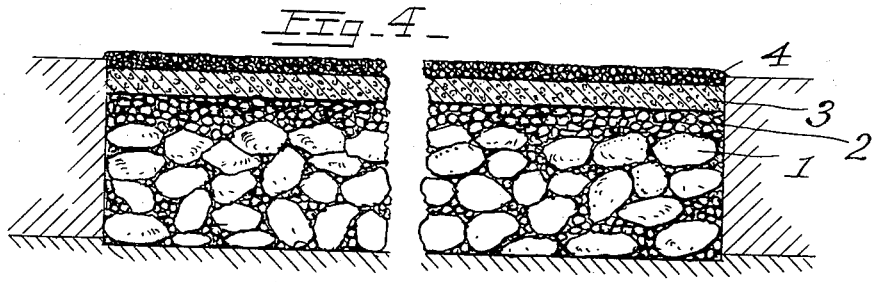
Figure 5:
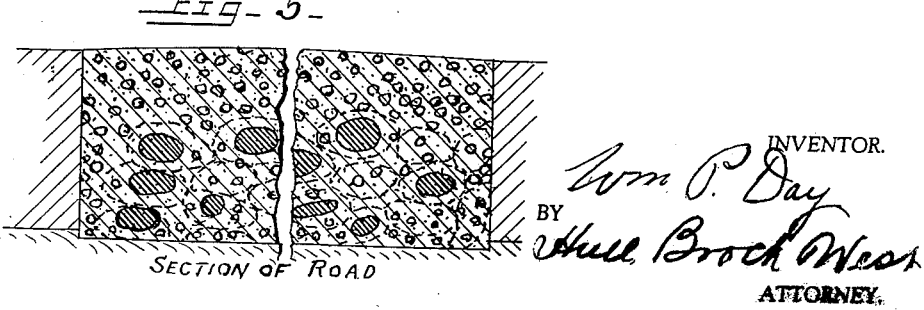

In the accompanying drawing, Figs. 1, 2, 3, 4 and 5 are diagrammatic views showing the different steps in the method used in repairing or rebuilding a roadbed. In practicing the method, after the old roadbed has been broken up and removed, I first replace a layer 1 made up of large pieces of the stone or other road forming material. These particles may vary in size from two to six inches and are usually irregular in shape. The depth of this first layer will vary depending upon the depth of the road, but with the road having an over-all depth of say nine inches, the first layer is preferably about five inches. I then apply a layer 2 of the smaller particles of the road forming material and spread them over the road in any suitable manner. The depth of this layer of smaller particles usually varies from one to three inches depending on the depth and character of the road. After this second layer of smaller particles of material is applied, I then apply rapid and violent vibrations to the road to cause the smaller particles to permeate the larger particles and to substantially fill the voids therein (see Fig. 3) by means of a vibrating tool or machine which applies the vibrations over substantially the entire area of the road. I then cover the road so formed with a thin layer 3 of harsh grout two or three inches in depth and spread thereover a thin layer 4 of granite screenings or other suitable material which may vary in size from about one-eighth of an inch to one-half an inch. I then again apply rapid and violent vibrations to the road in the same manner as before to cause the screenings and grout to penetrate the lower mass and to form a bond between the large and small particles of road forming material. I may use a larger or smaller percentage of screenings or new road forming material depending upon the condition of the old roadbed or the road may be formed entirely of new material.

The consistency of the road so formed will preferably be about 1 part cement, two parts sand and ten parts stone by volume. The character of the cement, grout and aggregate may vary depending upon the character of the road forming material and the depth of the road. With such a method, I am able to eliminate the necessity for a mesh or reinforcing grid and I have found that expansion joints are usually not necessary when this method is used.

I am able to make use of practically all of the old road forming material and to avoid the necessity for hauling it away and disposing of it. A road repaired or rebuilt by this method can be used for traffic almost immediately. The strength of the road is equal to the strength of the aggregate and is at least as strong, if not stronger, than the original road. The fact that the stones or pieces of road forming material are packed together so tightly and the fact that there are practically no voids between the particles of stone probably accounts for the fact that traffic may be let back on the road immediately, as the stones or particles of stone that form the road carry the load. This method is also adapted and intended to be used for patching or repairing small parts or areas of roadbeds and also in cases where it is desired to widen the road by adding a strip of say from two to four feet on either or both sides. In such a case, a form board is placed a desired distance away from the old roadway and the trench filled with large pieces of stone which may be obtained from adjacent property. The grout and granite screenings or other material may be applied in the same manner. The method is well adapted for repairing or rebuilding roads made of concrete, macadam, brick, stone and in fact any material generally used in making roads. If we compare the cost of this method of rebuilding roads with the cost of producing a new roadbed of say concrete, I am able to effect a saving of 50% to 75% with no increase in the cost of labor.

I have also found that I am able to obtain very satisfactory results with a slightly modified form of my method, which embodies the same principle and does not require any new road forming material except the grout. According to this method, I clean and scarify the old road and then break it up with a suitable tool, such as a pneumatic chisel or drill and then remove the same. I then replace the large particles and cover them with a layer of small particles of substantial depth. I then apply to the road a layer of grout sufficient to make a road of the required depth. I then apply vibrations to the road to cause the grout to settle and to thoroughly permeate the mass and bond the particles together. This method is particularly desirable for patch work. In most cases, as a final operation, I move over the road a vibrating screen which imparts to the road the desired level and shape. A vibrating screen of this character is well known in the art and is usually operated at high speed by an electric motor. This method is somewhat less expensive as only one vibrating operation is employed.

As a further modification of my invention, I am able to effectively repair or rebuild roads by first breaking up the old roadbed with a pneumatic chisel or drill and then removing all of the old road forming material. I then deposit on the subgrade a layer of grout of from two to four inches in thickness, depending upon the depth of the road. I then replace substantially all of the large pieces of road forming material. I then fill the trench to slightly above the old road level with a layer of the smaller particles of road forming material. I then impart rapid and violent vibrations to the mass in the manner hereinbefore described to cause the particles of road forming material to settle and displace the grout and to cause the grout to thoroughly permeate the mass. This vibration is continued until the grout comes to the top.

It is to be understood that the various methods herein described are to be considered merely as illustrative and not in a limiting sense as various changes may be made in the details of the method without departing from the spirit of my invention. For example, in some cases I have found it desirable, depending upon the character and constituents of the road forming material to break up the old roadbed in situ and then spread over the road so formed a layer of grout and then apply vibrations to the same in the manner described to cause the grout to permeate the mass.

In some cases, it is desirable to apply a small amount of new road forming material in the nature of fine stone, or gravel or sand to more effectively bond the large and small particles of the old roadbed.

While I have found that the best results are obtained when the preferred method is employed, I am able to obtain very effective results with the modified methods described. I also do not wish to be limited to any particular form or character of bonding material as I propose to use cement, grout, concrete or any other suitable material which will effectively penetrate and form a bond between the particles of the road. My method may also be used for forming new roads, that is, roads in which only new material is used. I also may use a harsh grout, that is, a grout which will not flow unless vibrated. It is also to be understood that when necessary, I make use of form boards to confine the road material during the vibrating operation.

In this specification, I have used the term "concrete" to mean any mixture of sand, water, stone, cement, cinders, gravel or other suitable material. The term "aggregate" is meant to define any material mixed with cement which is larger than sand. "Grout" is meant to define any mixture of sand, cement and water which will flow or which has to be vibrated in order to flow. The character of this grout and the amount of water used may be varied, depending upon the character and depth of the road.

Having thus described my invention, what I claim is:

1. The method of forming a roadbed which consists in spreading a layer of large particles of road-forming material, then spreading a layer of smaller particles of road-forming material, then applying rapid and violent vibrations to the road to cause the smaller particles to settle and to permeate the larger particles and to partially fill the voids therein, then spreading a layer of grout over the surface of the road so formed, and then again applying rapid and violent vibrations to the road to cause the grout to settle and to permeate the mass and to form a bond between the small and large particles.

2. The method of forming a roadbed which consists in spreading a layer of large particles of road-forming material, then spreading a layer of smaller particles of road-forming material, then applying rapid and violent vibrations to the road to cause the smaller particles to settle and to permeate the larger particles and to partially fill the voids therein, then spreading a layer of grout over the surface of the road so formed, and then again applying rapid and violent vibrations to the road to cause the grout to settle and to permeate the mass and to form a bond between the small and large particles, such vibrations being applied at the rate of 2000 to 4000 per minute and for about 30 to 60 seconds per square foot of surface area of the road.

3. The method of forming a roadbed which consists in first spreading a layer of large particles of road forming material, then spreading thereover a layer of smaller particles of road forming material, then applying rapid and violent vibrations over the entire surface of the road to cause the smaller particles to settle and to thoroughly permeate the larger particles, then spreading over the road so formed a layer of grout containing very finely divided particles of stone screenings and again applying rapid and violent vibrations to the road to cause the grout and smaller stones to permeate the larger aggregates and to fill the voids therein and to form a bond between the small and large particles.

4. The method of forming a roadbed which consists in spreading a layer of large particles of road forming material, then covering such first layer with a second layer of small particles of road forming material which layer contains a substantial number of fine particles, then applying rapid and violent vibrations to the road so formed to cause the smaller particles to permeate said first layer and to substantially fill the voids therein, then spreading a layer of harsh grout over the road so formed and again applying rapid and violent vibrations to the road to cause the grout to settle and to thoroughly permeate the mass and to form a bond between the small and large particles of road forming material.

WM. P. DAY.